United States Patent
Jones et al.

[15] 3,652,043
[45] Mar. 28, 1972

[54] LEAD SCREW COUPLING

[72] Inventors: Derek Jones, Campbell, Calif.; Woodrow L. Hayes, Rye, N.H.

[73] Assignee: Singer-General Precison, Inc., Binghampton, N.Y.

[22] Filed: Dec. 31, 1969

[21] Appl. No.: 889,585

[52] U.S. Cl. ................................................248/1, 64/18
[51] Int. Cl. ................................................A47g 29/00
[58] Field of Search ................74/89.15; 64/18; 248/184, 1

[56] References Cited

UNITED STATES PATENTS

| | | | |
|---|---|---|---|
| 78,571 | 6/1868 | Bronson | 64/18 |
| 1,058,878 | 4/1913 | Lowndes | 64/18 |
| 2,493,043 | 1/1950 | Stipsky | 248/184 |
| 2,605,072 | 7/1952 | Klein et al. | 248/184 |
| 2,643,557 | 6/1953 | Grove | 248/184 |
| 3,404,859 | 10/1968 | Chapman | 248/184 |

*Primary Examiner*—William F. O'Dea
*Assistant Examiner*—Wesley S. Ratliff, Jr.
*Attorney*—Francis L. Masselle, William Grobman and Charles S. McGuire

[57] ABSTRACT

The disclosed embodiment of the present invention is a coupling for a lead screw and the like having four degrees of freedom and two degrees of constraint. The coupling is generally formed of three rectangular member, two of which have a central rectangular aperture for receiving another one of the members therein. The innermost member is pivotally supported within the central aperture of the intermediate member on one axis, and the intermediate member is pivotally supported within the central aperture of the outermost member on a second axis perpendicular to the first axis. The inner and outer peripheral surfaces of the members in assembled form are slightly spaced from one another to permit limited pivotal movement of the inner and intermediate members about their respective axes and to permit limited axial movement of the inner and intermediate members along their respective axes with respect to the outer member.

1 Claims, 3 Drawing Figures

PATENTED MAR 28 1972  3,652,043
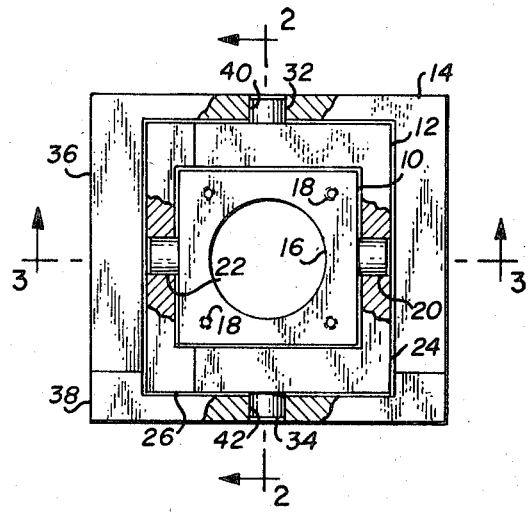
Fig_1
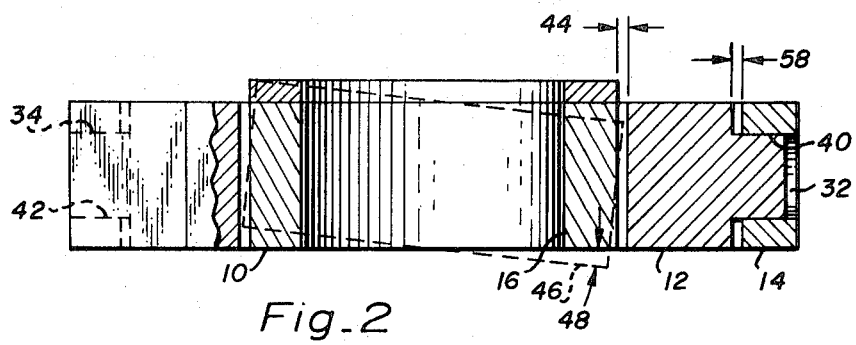
Fig_2
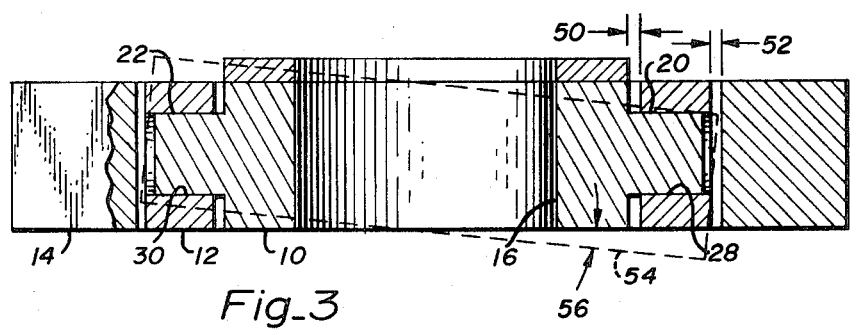
Fig_3
INVENTORS
DEREK JONES
WOODROW L. HAYES
BY

LEAD SCREW COUPLING

This invention relates generally to a coupling having four degrees of freedom and two degrees of constraint and in particular to such a coupling for a lead screw and the like.

Various mechanical configurations require precise positioning and movement of one part with respect to another part. For example, machine tools, X-Y plotters, and the like, include tables which are positioned by lead screws and other forms of actuators or positioning devices. Generally the table is guided and constrained to move in a desired direction along a predetermined path, normally in straight lines, on rails. The table includes grooves having bearings therein for engaging the rails. In those applications which require a high degree of accuracy in the positioning of, for example, a table, it is important to minimize the reaction at the bearings created by any load which may be imparted thereto by the lead screw or actuator. In particular, the problem involves mounting the reacting part of the actuator in such a manner that the table is propelled only in the required direction of travel.

MOst conventional lead screw drives require extremely accurate alignment between the axis of motion of the driven part and the lead screw axis. Accordingly, attempts are made to achieve exact straightness of the screw and to eliminate any torsional effects thereon such that straightness can be maintained during operation. The obvious result is that widely varying torque loads are reduced on the part to be displaced and wear on the tracks and guides is reduced. However, if the nut on the lead screw or the force transmitter is provided with at least four degrees of freedom and one degree of constraint, the lead screw need not have such a high degree of accuracy. The present invention permits the lead screw to be significantly out-of-straight and misaligned to the axis of motion without significantly effecting torque load or positional accuracy.

Accordingly, it is an object of the present invention to provide a coupling for a lead screw and the like having four degrees of freedom and two degrees of constraint.

Another object of the present invention is to provide a coupling which is considerably less complicated, easier to manufacture, and less costly than prior known couplers.

These and other objects, features and advantages of the present invention will be more fully realized and understood from the following detailed description, when taken in conjunction with the accompanying drawing, wherein:

FIG. 1 is an elevational view partly in section of a preferred embodiment of the present invention;

FIG. 2 is a second view taken along line 2—2 of FIG. 1; and

FIG. 3 is a sectional view taken along line 3—3 of FIG. 1.

Like reference numerals throughout the various views of the drawing designate the same or similar elements.

With reference to the drawing, there is shown a coupling constructed in accordance with the principles of the present invention which generally includes an inner member 10, an intermediate member 12, and an outer member 14. The inner member 10 is generally rectangular in shape and includes a central aperture 16 for receiving a lead screw or the like therethrough. It should be understood, of course, that the inner member 10 is not required to and does not engage the lead screw passing therethrough. A plurality of mounting holes 18 are provided in the member 10 for securing the coupling to the force transmitter on the actuator, such as the nut on a lead screw. The member 10 is provided with a pair of shafts 20 and 22 at opposite ends thereof. A common axis passing through the shafts 20 and 22 defines a first axis of rotation for the coupling.

The intermediate member 12 is formed of a "U" shaped member 24 and a member 26 which mates with the member 24 to form a generally rectangular aperture for receiving the member 10 therein. The member 24 is provided with an aperture 28 for receiving the shaft 20 therein, and the member 26 is provided with an aperture 30 for receiving the shaft 22 therein. The shafts 20 and 22 and the apertures 28 and 30 are machined to provide a bearing fit therebetween. The member 24 is also provided with a pair of shafts 32 and 34. A common axis passing through the shafts 32 and 34 defines a second axis of rotation for the coupling.

The outer member 14 is formed of a "U" shaped member 26 and a member 38 mating therewith to define a central rectangular aperture for receiving the intermediate member 12 therein. The member 36 is provided with an aperture 40 for receiving the shaft 32 therein and the member 38 is provided with an aperture 42 for receiving the shaft 34 therein. The shafts 32 and 34 and the apertures 40 and 42 are machined to provide a bearing fit therebetween.

On a line perpendicular to the axis defined by shafts 20 and 22, the outer periphery of the member 10 is spaced from the inner periphery of the member 12 by an amount indicated with the reference numeral 44 in FIG. 2. The distance 44 is of a dimension to permit limited rotational movement of the member 10 with respect to the member 12 as indicated by the dotted line outline of the member 10 in FIG. 2. As a result of this spacing, member 10 can be rotated through an angle designated with the reference numeral 48. Along a line parallel to the axis defined by the shafts 20 and 22, the outer periphery of the member 10 is spaced from each side of the inner periphery of the member 12 by an amount designated with the reference numeral 50 in FIG. 3. As a result of this spacing, the member 10 can move axially along the axis defined by the shafts 20 and 22 with respect to the member 12 by an amount equal to twice the distance 50.

Along a line perpendicular to the axis defined by the shafts 32 and 34, the outer periphery of the member 12 is spaced from the inner periphery of the member 14 by an amount designated with the reference numeral 52 in FIG. 3. The distance 52 is of a dimension to permit limited rotational movement of the member 12 with respect to the member 14 as indicated by the dotted line outline of the member 12 which is designated with the reference numeral 54. As shown in FIG. 3, the member 12 can be rotated through an angle designated with the reference numeral 56 with respect to the member 14. Along a line parallel to the axis defined by the shafts 32 and 34, the outer periphery of the member 12 is spaced from each side of the inner periphery of the member 14 by an amount designated with the reference numeral 58 in FIG. 2. Accordingly, the member 12 can move axially along the axis defined by the shafts 32 and 34 by an amount equal to twice the distance 58 with respect to the member 14.

It can be readily appreciated from the above description that if a table or the like structure is secured to the member 14, and a force transmitting member is secured to the member 10, the coupling will provide four degrees of freedom and two degrees of constraint therebetween. The four degrees of freedom include (1) rotation about the axis defined by the shafts 20 and 22, (2) linear movement parallel to the axis defined by the shafts 20 and 22, (3) rotation about the axis defined by the shafts 32 and 34, and (4) linear movement parallel to the axis of the aperture 16. Accordingly, any motion of the lead screw nut or force transmitting member along the axis of the aperture 16 will be reflected by corresponding movement of the member 14 in the same direction.

It can also be readily appreciated from the above description and the drawing that the coupling of the present invention is relatively uncomplicated, does not present any difficult machining problems, and is relatively inexpensive to construct. Fabrication of the individual members requires the simplest machining operations. Assembly of the coupling is relatively simple, as can be readily appreciated from the drawing. Assembly is accomplished by inserting the shaft 20 into the aperture 28 of the member 24 and attaching the member 26 to the member 24 by suitable machine screws (not shown) while passing the shaft 22 into the aperture 30. The outer member 14 is assembled onto the intermediate member 12 in the same manner. The inner member 10 can be secured to the force transmitting member of the actuator and the member 14 can be secured to the driven part.

The invention claimed is:

1. Intermediate coupling structure for imparting linear motion from a lead screw nut to a table, or the like, said structure comprising, in combination:
    a. an inner member having a central, circular aperture through which the lead screw may extend and means for fixedly securing the lead screw nut thereto;
    b. an intermediate member having a central, rectangular aperture coaxial with the aperture of said inner member;
    c. means pivotally supporting said inner member in the aperture of said intermediate member for rotation about and linear movement along a first axis with respect thereto;
    d. an outer member for fixed attachment to the table and having a central, rectangular aperture coaxial with the apertures of said inner and intermediate members;
    e. means pivotally supporting said intermediate member in the aperture of said outer member for rotation about and linear movement along a second axis, mutually perpendicular to said first axis and the axis of said aperture;
    f. the outer dimensions of said inner member relative to the dimensions of the aperture of said intermediate member being such that said rotation about and linear movement along said first axis are restricted; and
    g. the other dimensions of said intermediate member relative to the dimensions of the aperture of said outer member being such that said rotation about and linear movement along said second axis are restricted.

* * * * *